(12) United States Patent
Han et al.

(10) Patent No.: US 7,974,302 B2
(45) Date of Patent: Jul. 5, 2011

(54) HYBRID IMPLICIT TOKEN CARRIER SENSING MULTIPLE ACCESS/COLLISION AVOIDANCE PROTOCOL

(75) Inventors: Tae Man Han, Daejeon (KR); You Hyeon Jeong, Daejeon (KR); Heesung Chae, Daejeon (KR); Dong Won Kim, Daejeon (KR); Jun Hwa Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 106 days.

(21) Appl. No.: 12/577,831

(22) Filed: Oct. 13, 2009

(65) Prior Publication Data
US 2010/0027558 A1 Feb. 4, 2010

Related U.S. Application Data

(63) Continuation of application No. 10/930,080, filed on Aug. 30, 2004, now Pat. No. 7,643,509.

(30) Foreign Application Priority Data

Dec. 22, 2003 (KR) .................................. 2003-94420

(51) Int. Cl.
*H04L 12/413* (2006.01)
(52) U.S. Cl. ....................................................... 370/445
(58) Field of Classification Search .................. 370/445, 370/450, 455, 461, 462, 458, 459, 338, 447, 370/443, 444, 328, 503, 395.21; 455/435.3, 455/451, 509, 452.2, 9
See application file for complete search history.

(56) References Cited

U.S. PATENT DOCUMENTS

| 4,864,576 A | 9/1989 | Mark |
| 5,371,734 A | 12/1994 | Fischer |
| 5,535,212 A | 7/1996 | Koopman et al. |
| 7,233,603 B2 * | 6/2007 | Lee ............................... 370/445 |

FOREIGN PATENT DOCUMENTS

| KR | 2000-0032876 | 6/2000 |
| KR | 1020030035228 A | 5/2003 |
| WO | 02/41590 A1 | 5/2002 |

OTHER PUBLICATIONS

Won-Joo Hwang, et al; "Design of the HomeMAC: QoS Based MAC Protocol for the Home Network", IEICE Trans. Commun., vol. E85-B, No. 5, May 1, 2002, pp. 1002-1011.

(Continued)

*Primary Examiner* — Chi H Pham
*Assistant Examiner* — Alexander Boakye
(74) *Attorney, Agent, or Firm* — Ladas & Parry LLP

(57) ABSTRACT

Provided is a distributed and asynchronous implicit token carrier sense multiple access/collision avoidance (CSMA/CA) protocol guaranteeing quality of service for both real time and non-real time traffic. The implicit token CSMA/CA protocol allocates a band in an entire bandwidth to voice traffic and allows the remaining bands to be used for data traffic. The implicit token CSMA/CA protocol includes applying a token passing protocol to transmit voice traffic in real time by having a band in an entire bandwidth allocated using a predetermined data frame and applying a CSMA/CA mechanism to transmit data traffic in non-real time by employing remaining bands not allocated to the voice traffic using another predetermined data frame.

4 Claims, 2 Drawing Sheets

OTHER PUBLICATIONS

Won-Joo Hwang, et al; "Software Implementation and Empirical Evaluation of the HomeMAC: QoS Based MAC Protocol for the Home Network", IEICE Trans. Commun., vol. E85-B, No. 3, Mar. 1, 2002, pp. 623-632.

Shengming Jiang, et al; "A Simple Distributed PRMA for MANETs", IEEE Transactions on Vehicular Technology, vol. 51, No. 2, pp. 293-305, Publication Date: Mar. 2002 (Exact date not given).

David J. Goodman; "Cellular Packet Communications" IEEE Transactions on Communications, vol. 38, No. 8, pp. 1272-1280, Aug. 1990 (Exact date not given).

Chunhung Richard Lin, et al; "Asynchronous Multimedia Multihop Wireless Networks" INFOCOM '97, Sixteenth Annual Joint Conference of the IEEE Computer and Communications Societies, Kobe, Japan; Apr. 9-11, 1997; pp. 118-125.

Chenxi Zhu, et al; "A Five-Phase Reservation Protocol (FPRP) for Mobile Ad Hoc Networks", INFOCOM '98. Seventeenth Annual Joint Conference of the IEEE Computer and Communications Societies. Proceedings. IEEE Publication Date: Mar. 29-Apr. 2, 1998, vol. 1, pp. 322-331.

Inwhee Joe et al; "Reservation CSMA/CA for Multimedia Traffic over Mobile Ad-hoc Networks", 2000 IEEE International Conference on Communications, 200. ICC 2000; Publication Date 2000, vol. 3, pp. 1714-1718, Meeting Date; Jun. 18-22, 2000, New Orleans, LA.

Shiann-Tsong Sheu, et al; "A Bandwidth Allocation/Sharing/Extension Protocol for Multimedia Over IEEE 802.11 *Ad Hoc* Wireless LANs", IEEE Journal on Selected Areas in Communications, vol. 19, No. 10, pp. 2065-2080, Oct. 2001, (Exact date not given).

USPTO Office Action mailed Jun. 27, 2008 for Parent U.S. Appl. No. 10/930,080.

USPTO Office Action mailed Jan. 5, 2009 for Parent U.S. Appl. No. 10/930,080.

\* cited by examiner

HYBRID IMPLICIT TOKEN CARRIER SENSING MULTIPLE ACCESS/COLLISION AVOIDANCE PROTOCOL

This application claims the priority of Korean Patent Application No. 2003-94420, filed on Dec. 22, 2003, in the Korean Intellectual Property Office, the disclosure of which is incorporated herein in its entirety by reference.

BACKGROUND OF THE INVENTION

1. Field of the Invention

The present invention relates to a communications network, and more particularly, to a protocol for a media access controller for a mobile ad-hoc network.

2. Description of the Related Art

A major challenge in a mobile ad-hoc network (MANET) is to design a media access controller (MAC) that can handle requirements for multiple media accesses to the MANET in real time. The challenge stems from the fact that the MANET does not have a stationary and centralized coordinator such as a base station and that its topology changes frequently. Further, the MAC should satisfy the needs for quality of service (QoS) in real time and for portability or mobility by being able to accommodate smaller and lighter batteries.

Conventional MACs for a wireless local area network (WLAN) usually use a carrier sense multiple access (CSMA), which is an asynchronous random access mechanism, due to its simple configuration and ease of implementation. However, due to the problem of a "hidden terminal," a multiple access with collision avoidance (MACA) protocol using a request-to-send (RTS) frame and a clear-to-send (CTS) frame was suggested.

IEEE802.11 working group developed a MAC protocol as an international standard for the MANET as well as the WLAN. The MAC protocol uses a carrier sense multiple access/collision avoidance (CSMA/CA) mechanism as a distributed coordinate function (DCF). To avoid collisions, each equipment on the WLAN monitors when the other equipment attempts to and when waits to transmit a packet. However, such a random access is not suitable for real time and periodic traffic. To complement this, polling-based real time traffic is supported by a centralized point coordinator function (PCF), which, however, is not suitable for the MANET environment that does not have a centralized coordinator. Therefore, a variety of protocols have been suggested to secure the quality of real-time traffic.

A multiple access with collision avoidance/piggyback reservation (MACA/PR) protocol is a time division multiplex (TDM) combined MAC protocol in a broad sense and uses a non-persistent CSMA mechanism for a Datagram. In this protocol, a node does not respond using the RTS and the CTS frames in its reservation table by sensing the state of a channel after a free window period. Instead, the node responds using the propagation and maintenance of reservation tables managed by neighboring nodes. Therefore, the operation of the reservation table is complicated. In addition, when a new node is added to a system, the new node should learn present reservations in a listening mode for a sufficient period of time and wait until it receives a reservation table from its neighboring nodes. Unlike a slot mechanism, an un-slot mechanism is freed from the difficulty of synchronization. However, as the provision and synchronization of a clock signal are not a problem for advanced communication systems such as a global positional system (GPS), a slotted MAC has begun to draw attention and, accordingly, diverse protocols have been suggested.

An enhanced time division multiple access (E-TDMA) protocol is reserved at a talk-spurt level. The reservation process is a five-phase procedure and takes a long time. A time division multiple access/frequency division duplex (TDMA/FDD) protocol is reserved on a call basis and not frequently used due to silence.

As described above, although a variety of slotted protocols have been suggested, these protocols additionally require the GPS or a station functioning as a centralized controller. Further, system synchronization is difficult and the operation of the protocols is complicated.

SUMMARY OF THE INVENTION

The present invention provides a distributed and asynchronous implicit token carrier sense multiple access/collision avoidance (CSMA/CA) media access controller (MAC) protocol guaranteeing quality of service for both real time and non-real time traffic. The implicit token CSMA/CA protocol allocates a band in an entire bandwidth to voice traffic and allows the remaining bands to be used for data traffic.

According to an aspect of the present invention, there is provided a hybrid implicit token CSMA/CA protocol including applying a token passing protocol to transmit voice traffic in real time by having a band in the entire bandwidth allocated using a predetermined data frame; and applying a CSMA/CA mechanism to transmit data traffic in non-real time by employing remaining bands not allocated to the voice traffic using another predetermined data frame.

The applying of the token passing protocol uses three inter frame spaces to sense a real time transmission frame, a real time reservation frame, and a non-real time transmission frame. The three inter frame spaces have different priorities. For example, the shortest IFS has the highest priority.

The three IFSes includes a distributed coordinate function IFS (DIFS), a real time IFS (RIFS), and a shortest IFS (SIFS). The DIFS is used for sensing the non-real time transmission frame and indicates a period during which a medium ends its busy state and transmits data in real time. The RIFS is used for sensing the real time reservation frame and indicates a period after the medium ends its busy state and before transmitting data in real time. The SIFS is used for sensing the real time transmission frame and indicates a period after the medium ends its busy state and before transmitting data in real time, which is shorter than the real time inter frame space.

The applying of a CSMA/CA mechanism includes monitoring the state of a channel and transmitting a request-to-send frame after the DIFS when the channel is free for the DIFS; receiving a clear-to-send frame after the SIFS; transmitting a packet after the SIFS; and generating an acknowledgement frame after the SIFS.

The applying of the token passing protocol includes reserving a token in a token reservation table by a station that enters in an authority range of a voice call system and is given a token number corresponding to its turn for transmission; updating a token counter of the station when the station senses a token number acknowledgement frame that occurs when real time traffic is transmitted or a data acknowledgement frame that occurs when non-real time traffic is transmitted; comparing an updated value of the token counter with the token number; and implicit token passing in which the station is given a first priority to transmit a packet when present traffic transmission is terminated if the updated value of the token counter and the token number are the same. The token reservation table operates as a mod N by setting a maximum entry to an actual number of N.

The applying of the token passing protocol further includes automatically incrementing the value of the token counter by one by all stations when there is no real time data frame or non-real time data frame.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
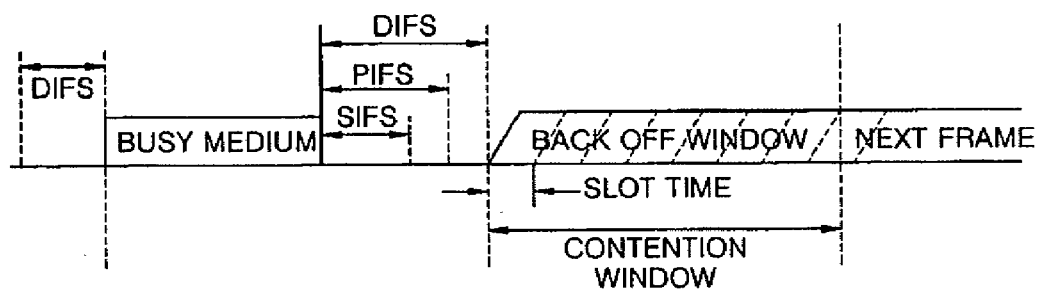
FIG. 1 is a diagram illustrating a conventional inter frame space (IFS)

The attached drawings for illustrating embodiments of the present invention are referred to in order to gain a sufficient understanding of the present invention, the merits thereof, and the objectives accomplished by the implementation of the present invention.

Hereinafter, the present invention will be described in detail by explaining embodiments of the invention with reference to the attached drawings. Like reference numerals in the drawings denote like elements.

A hybrid implicit token carrier sense multiple access/collision avoidance (CSMA/CA) protocol according to an embodiment of the present invention will now be described.

The Operation of the Hybrid Token CSMA/CA MAC Protocol and Call Processing Procedure One of the most important challenges in an integrated voice and data network is to meet requirements for real-time voice traffic. To that end, a bandwidth required for voice traffic should be secured while the use of a band for data traffic should be limited.

FIG. 1 is a diagram illustrating a conventional inter frame space (IFS). Referring to FIG. 1, the IFS is classified into a short inter frame space (SIFS), a PCF inter frame space (PIFS), and a DIF inter frame space (DIFS).

The DIFS indicates a period between a busy medium and a contention window. The SIFS indicates a shortest period within the scope of the DIFS period, and the PIFS indicates a period shorter than the DIFS period and longer than the SIFS period. The SIFS period is used mostly in a control frame. When a medium is idle for a longer period than the DIFS period, the medium is immediately accessed.

Figure 2:
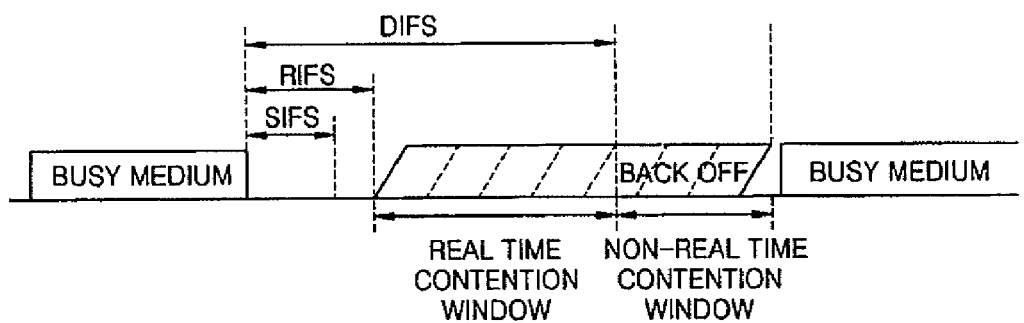
FIG. 2 is a diagram illustrating the relationship between IFSes used in a distributed coordinate function (DCF) of a hybrid implicit token carrier sensing multiple access/collision avoidance (CSMA/CA) protocol according to an embodiment of the present invention.

FIG. 2 is a diagram illustrating the relationship between IFSes used in a distributed coordinate function (DCF) of the hybrid implicit token CSMA/CA protocol according to an embodiment of the present invention. Referring to FIG. 2, the DCF uses three IFSes with different priorities.

A DCF IFS (DIFS) indicates a period during which a medium ends its busy state and transmits data in real time. After completing real-time data transmission, the medium backs off.

A real-time IFS (RIFS) indicates a period after the medium ends its busy state and before transmitting data in real time. A shortest IFS (SIFS) indicates a period after the medium ends its busy state and before transmitting data in real time, and shorter than the RIFS period.

The SIFS period is used for a frame such as a clear-to-send (CTS) frame and an acknowledgement (ACK) frame requiring immediate control. The SIFS period is also used for transmitting a real-time frame packet such as a voice by a node that was already allocated a token. The RIFS period is used by a real-time reservation frame such as a request-to-send (RTS) frame requesting the allocation and reservation of a token. The DIFS period has the lowest priority and the longest IFS.

Components of a Node

Generally, a node (a mobile terminal or a voice station) includes a token reservation table, a token counter, and a token number register. The token reservation table is used by a node to participate in a voice call system by reserving a token to secure a transmission band for every frame.

The token counter calculates a token number passed by counting a number of ACK (token number) frames or ACK (data) frames.

The token number register stores a token number that determines the transmission turn of a node.

Procedure for Participating in a Voice Call System

Each node (a voice station or a mobile terminal) participates in a voice call system on a contention basis. A procedure for a node to participate in the voice call system will now be described. The voice call system observes a frame on a network for a sufficient period of time. When the voice call system senses the ACK frame (token number), it requests a node to copy the token reservation table for the DIFS period. The node can participate in the voice call system after receiving the token reservation table.

From this time on, each node should continuously observe the CTS (token number) frame, the ACK (token number) frame, the ACK (data) frame, and data packets released while updating the token reservation table.

When a node senses the ACK (data) frame, the token counter increments its value by one. When the value of the token counter exceeds a set value of N, the token counter is reset to one and operates like a mod N. By setting a marginal value of N, the present invention provides automatic call admission control according to whether a blank token can be allocated.

When a medium has been blank for the RIFS period, each transmission node being a caller transmits the RTS frame to one of the nodes contending for a call. A node receiving the RTS frame searches for an available token number in a voice call table and notifies a transmission node selected by contention of the token number through the CTS (token number) frame after the SIFS period. The token number becomes a call number and a token number of the transmission node and stored in the token number register.

A node corresponding to the transmission node selects a token number usable in pairs (N/2+available token number), stores the token number in its token number register, and uses it as its token number.

Each of the voice call nodes marks a token number and a token number usable in pairs (N/2+token number) with 'reserved' in its token reservation table, thereby indicating that the numbers are allocated to and being used by a node in the voice call system. Contents of the token reservation table are managed in this way.

Voice Transmission Procedure

When all nodes (voice stations) are activated, that is, when all nodes are participating in the voice call system, the nodes can transmit packets when they hold tokens after retaining token number.

Whenever a voice station possessing a token sequentially senses a data packet frame (PKT) and the ACK (token number) frame or the RTS frame, the CTS frame, a data packet, and the ACK (data) frame, the token counter increases the token counters value by one. Then, the token counters value is compared with a token number of the voice station. When the token counter's value is the same as the token number, the voice station perceives that it is its turn to transmit a packet and that the token is being held.

The voice station holding the token transmits the packet in real time immediately after the SIFS period. A voice station receiving the packet responds through the ACK (token number) frame after the SIFS period. In other words, the token is passed to the next voice station.

When the voice station holding the token does not have a packet to transmit, the channel remains idle. If the channel remains idle even afterthe RIFS period, backlogged data stations are granted an opportunity to contend for the channel to transmit the RTS frame after the DIFS period.

Data Transmission Procedure

Data stations operate using the CSMA/CA mechanism. The backlogged data stations cannot transmit messages at any time. The data stations continuously observe the state of the channel and, when the channel is free during the DIFS period, sequentially go through the RTS frame transmission, the SIFS period, the CTS frame reception, the SIFS period, the packet transmission, the SIF period, and the ACK frame recognition according to the IEEE 802.11 standard before contending for an opportunity to transmit messages. Here, the ACK frame is the data ACK frame.

Token Circulation

When a voice station senses the ACK (token number) frame that occurs when real time traffic is transmitted or the ACK (data) frame that occurs when non-real time traffic is transmitted, the token counter is updated, which leads to a token passing. When a value stored in a program table counter (PTC) plus one (PTC+1) is the same as a token number of the station, a token is deemed as being held for the next transmission.

A voice station possesses a voice token and catches the voice token again after a predetermined period of time after completing its job. The circulation of a voice token is repeated. After a voice station holds a token up to an $n^{th}$ time, the voice station will obviously re-catch the voice token. Here, n is a number of allowed activated voice stations.

Voice token circulation time is the time taken for a voice station to catch a token again after catching the voice token. The voice token circulation time is a maximum value of a voice packet delay time and composed of n times of token holding. The n times of token holding may be either voice transmission or data transmission.

The present invention monitors the token circulation to be prepared for a case where the circulation of the token is prevented, for example, when there is no traffic, or when the RTS frame collides consecutively. In other words, when no transmission occurs for a maximum contention window (CW), which is the longest period during which contention can occur, each node automatically adds one to the value stored in the PTC (PTC+1).

Since no traffic occurs until a node holds a token for the next real-time transmission after transmitting a message in real time, when the node catches a token by automatically incrementing the PTC, it does not transmit the PKT frame in real time immediately after the SIFS period. Instead, the node sequentially senses the RTS frame transmission, the CTS frame reception, the packet transmission, and the ACK (token number) frame after the RIFS period before starting its transmission. Hence, the counters value of each station is refreshed.

Call Termination

When terminating a call, either the caller or the called may send a connection_end message. A receiver of the connection_end message broadcasts the ACK (released token number) frame to return the allocated token number to the idle state.

Automatic call admission control is performed according to whether a blank token can be allocated since the number of entries in the token reservation table is limited to n.

Figure 3:
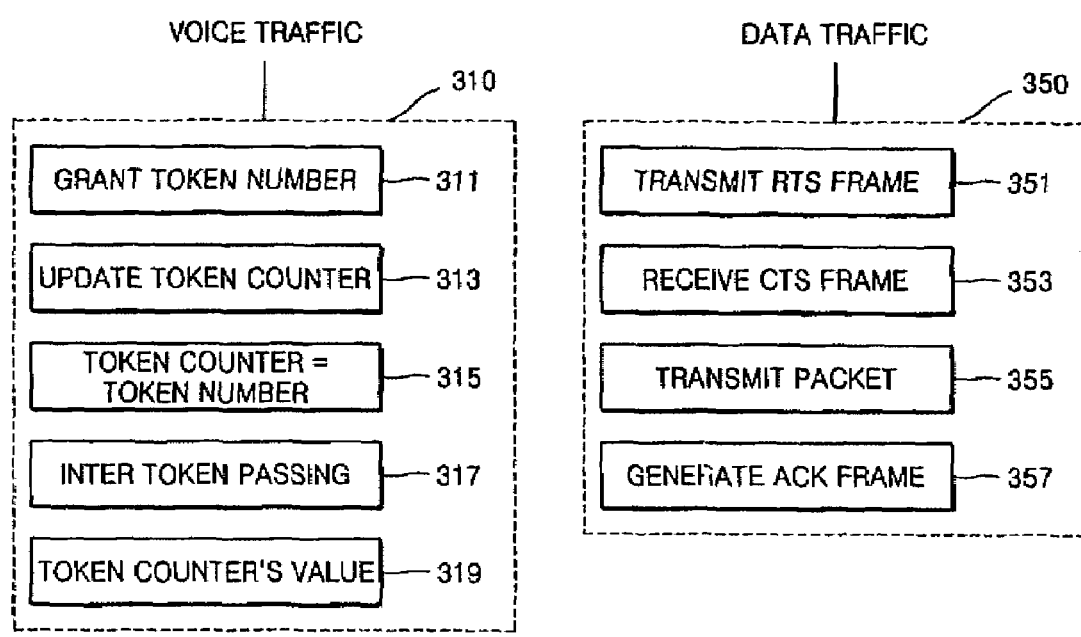
FIG. 3 is a flowchart illustrating a hybrid implicit token CSMA/CA protocol according to an embodiment of the present invention.

FIG. 3 is a flowchart illustrating a hybrid implicit token CSMA/CA protocol according to an embodiment of the present invention. Referring to FIG. 3, the hybrid implicit token CSMA/CA protocol includes Operations 310 and 350. In Operation 310, a token passing protocol is applied to transmit voice traffic in real time by having a band in the entire network bandwidth allocated using a predetermined data frame. In Operation 350, the CSMA/CA mechanism is applied to transmit data traffic in non-real time using the remaining bands not allocated to the voice traffic.

Referring to Operation 310 of applying the token passing protocol, a station that enters into the authority range of the voice call system reserves a token in the token reservation table and is given a token number corresponding to its turn for transmission, in Operation 311. When the station given the token number senses the ACK (token number) frame that occurs when real-time traffic is transmitted by other stations or the ACK (data) frame that occurs when non-real time traffic is transmitted, the token counter of the station is updated in Operation 313. Then, the updated value of the token counter is compared with the token number (Operation 315). When the updated value of the token counter is the same as the token number, implicit token passing occurs in which a node is given a first priority to send a packet when the traffic being transmitted is terminated (Operation 317).

When the real time data frame or the non-real time data frame does not occur in the maximum contention window, all stations automatically increment the value of the token counter by one to prevent the termination of token passing, in Operation 319.

Referring to Operation 350 of applying the CSMA/CA mechanism, the station observes the state of the channel and transmits the RTS frame after the DIFS period when the medium is free for the DIFS period, in Operation 351. The CTS frame is received after the SIFS period in Operation 351. A packet is transmitted after the SIFS period in Operation 355. The ACK frame is generated after the SIFS period in Operation 357.

As described above, a hybrid implicit token CSMA/CA protocol according to the present invention can prevent the collision of voice and data transmissions by securing a bandwidth for real time voice traffic while limiting the use of a band for data traffic.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A media access control method of a wireless communication system, the method comprising:

transmitting one or more frames based on a contention-free based media access protocol at a timing when receiving a predetermined frame from a media access controller, wherein the predetermined frame includes information to determine the timing; and transmitting one or more frames based on a carrier sense multiple access/collision avoidance protocol (CSMA/CA) when not receiving the predetermined frame from the media access controller, wherein the contention based media access protocol uses a plurality of inter frame spaces (IFSs), wherein the duration of IFS with a higher priority is shorter than the duration of IFS with a lower priority, wherein CSMA/CA protocol comprise:

monitoring a state of a channel and transmitting a Request To Send frame to the media access controller when the channel is free during a predetermined duration of IFS, receiving a Clear to Send frame from the media access controller after the shortest IFS; and transmitting a frame to the media access controller after the shortest IFS.

2. The method of claim 1, the duration of inter frame space for the predetermined frame is shorter than the duration of inter frame spaces for the contention based media access protocol.

3. The method of claim 1, wherein the contention-free base media access protocol is a token passing protocol.

4. The method of claim 1, wherein CSMA/CA protocol further comprising receiving an acknowledgement frame from the media access controller after the shortest IFS.

* * * * *